Nov. 22, 1960

S. S. FLASCHEN ET AL 2,961,350

GLASS COATING OF CIRCUIT ELEMENTS

Filed March 20, 1959

INVENTORS S. S. FLASCHEN
A. O. PEARSON

BY

ATTORNEY

INVENTORS S. S. FLASCHEN
A. D. PEARSON

BY George S. Indig
ATTORNEY

Nov. 22, 1960     S. S. FLASCHEN ET AL     2,961,350
GLASS COATING OF CIRCUIT ELEMENTS
Filed March 20, 1959     7 Sheets-Sheet 3

INVENTORS S. S. FLASCHEN
BY A. D. PEARSON

ATTORNEY

Nov. 22, 1960  S. S. FLASCHEN ET AL  2,961,350
GLASS COATING OF CIRCUIT ELEMENTS
Filed March 20, 1959  7 Sheets-Sheet 4

INVENTORS S. S. FLASCHEN
A. D. PEARSON
BY
ATTORNEY

Nov. 22, 1960 S. S. FLASCHEN ET AL 2,961,350
GLASS COATING OF CIRCUIT ELEMENTS
Filed March 20, 1959 7 Sheets-Sheet 5

INVENTORS: S. S. FLASCHEN
A. D. PEARSON
BY
*George S. Indig*
ATTORNEY

INVENTORS: S. S. FLASCHEN
A. D. PEARSON
BY
George S. Indig
ATTORNEY

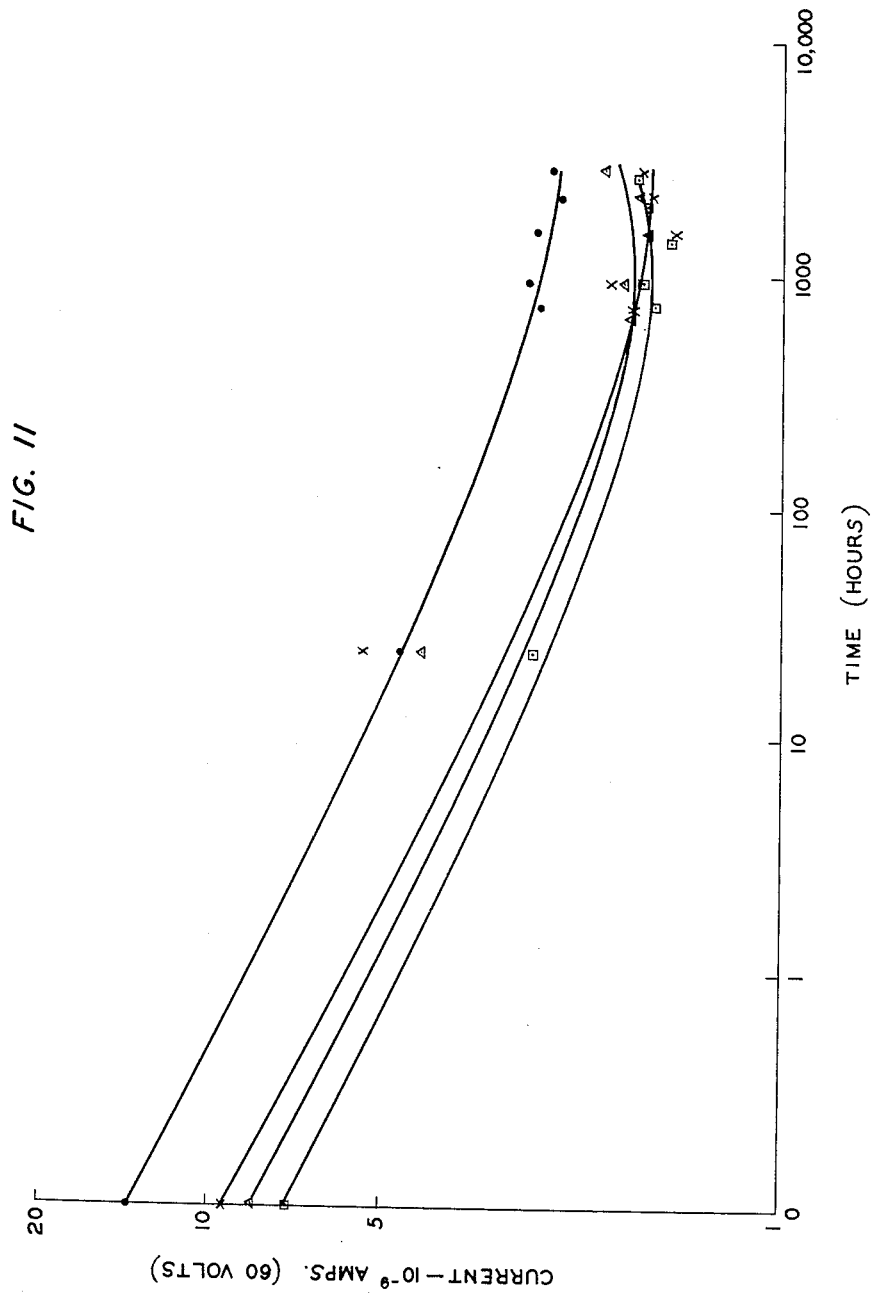

United States Patent Office 2,961,350
Patented Nov. 22, 1960

1

2,961,350

GLASS COATING OF CIRCUIT ELEMENTS

Steward S. Flaschen, New Providence, and Arthur D. Pearson, Springfield, N.J., assignors to Bell Telephone Laboratories, Incorporated, New York, N.Y., a corporation of New York Filed Mar. 20, 1959, Ser. No. 798,912

16 Claims. (Cl. 117—200)

This invention relates to a new class of glass compositions of unique interest in the packaging of electrical circuit elements as well as of assemblies and subassemblies including such elements and also to related packaging methods and articles so produced.

This application is a continuation in part of U.S. application Serial No. 730,832, filed April 28, 1958, now abandoned.

The glasseous compositions of this invention evidence low liquid viscosities in the temperature range of from about 185° C. to 450° C. and higher. Certain of these compositions have low softening points, in some instances at or below room temperature, so that the final product is plastic to the touch under such conditions. Accordingly, thermal shock problems may be minimized.

The subject compositions have good wetting power for many materials including most common metals, other glass compositions such as the silicates, ceramic and single crystalline inorganic materials, and organic polymers including polytetrafluoroethylene.

All of the glasseous compositions set forth herein may be vapor deposited as glasseous compositions on substrates of varying nature, either heated or unheated. Whereas common glasses may be vapor deposited homogeneously only with difficulty in extremely thin layers on heated substrates, use of the instant compositions permits deposition of layers of thickness of the order of a mil or greater on cold as well as heated substrates.

Probably the most important property of the subject compositions is their strong gettering affinity for ionic impurities. As is well known, ionic impurities, notably sodium, other alkali metals and silver, are a common source of operational difficulties in circuit elements in general. Such impurities tend to diffuse under the influence of an electrical field produced during operation, or in the instance of junction devices inherently present, so as to produce an attendant deterioration in electrical characteristics during use. This may result in an impairment of dielectric properties in capacitors, in a decrease in resistance, and in other commonly observed changes in components of all types. Perhaps the most harmful characteristic changes due to this source are observed in semiconductor devices such as diodes, transistors and related elements.

Specific examples and measured data presented in both tabular and graphical form herein demonstrate the gettering activity of these glass compositions. Due to the extreme sensitivity of semiconductor devices to this source of contamination, most of the operational data concerns such devices. As is described herein, ionic gettering may produce improvement in electrical characteristics at three different stages. The encapsulating procedure itself, particularly where the composition is used relatively hot, may result in significant improvement. This improvement is, of course, enhanced with increased time of exposure to the molten encapsulating medium. In this connection it is observed that prolonged exposure times in no way impair other electrical or physical properties of the devices.

Operating characteristics of semiconductor devices are also improved upon shelf aging. Accelerated shelf aging, during which the elements are maintained at elevated temperatures of the order of up to 150° C. or higher for several hours, results in still more marked improvement. Power aging, in accordance with which devices are electrically biased to approximate or exceed operating conditions, employed to screen devices, heretofore generally resulted in relatively constant although impaired operating characteristics. However, where employed on devices including gettering or encapsulating layers of the compositions herein, such aging results in constant improvement in electrical characteristics, the degree of improvement increasing with the severity of the aging conditions.

As is set forth herein, these amorphous compositions have high body and sheet resistivities and favorable dielectric and other electrical properties relative to commercially available glass compositions. Other chemical and physical properties of these compositions making them uniquely suitable as packaging media for electrical components are set forth herein.

During the first few years of commercial use of extrinsic semiconductor devices, notably point and junction type diodes and triodes, it was assumed that such devices would manifest a high degree of stability against deteriorative effects due to surface absorption of moisture and gases and other surface reactions with atmospheric components. Accordingly, although such devices were frequently dipped in or otherwise coated with a plastic medium to improve mechanical rigidity and facilitate handling, it was not generally considered necessary to provide a hermetic seal. With the continuing miniaturization and other development of semiconductor devices, resulting in decreasing spacing between point contacts and/or p-n junctions, and as further experience was gained in the use of such devices, it became increasingly apparent that the presence of very small amounts of moisture and other foreign matter on the surface, especially in the vicinity of such point contacts or junctions, had an adverse effect on the electrical properties of the devices. It was further found that such effects were variable with changing ambient conditions and that the plastic coatings then in use did not impart sufficient protection against such effect. Laboratory studies revealed that moisture and other atmospheric ingredients penetrated the plastic medium, particularly in the vicinity of wire leads used to make electrical connection with the devices.

With the realization that a hermetic seal was necessary to prevent a gradual drift in electrical characteristics of the transistor, a considerable amount of research was directed and continues to be directed to the development of a medium and method suitable for such purpose. At the present time, the most common type of hermetic seal makes use of a welded can. In the development of this type of seal, it was first thought sufficient to encapsulate in a dry atmosphere, taking only the standard precautions against the presence of water vapor. Further developments include vacuum baking before and during seal-off, and, particularly where the device is made of silicon, a back fill of dry oxygen during seal-off.

Although the welded can-type of hermetic seal is finding extensive commercial use at this time, the recognition of certain undesirable characteristics has resulted in a continuation of efforts to find a more suitable medium and technique. It is generally recognized that the welded can-type of hermetic seal, no matter how carefully made, either due to leakage or desorption of gases from internal surfaces, eventually makes for a gradual deterioration of operating characteristics. This effect is most noticeable where junction spacings are very close as, for example, of the order of tenths of a mil apart. From the manufacturing standpoint, the use of such metal seals necessitates a complex sealing procedure including, for example, the need for making insulating hermetic seals between the wire leads and the can. From the design engineer's standpoint, canned devices are sometimes undesirable in that the size of the device is greatly increased, thereby losing some of the advantages resulting from miniaturization of the operative portion of the transistor.

In accordance with this invention, it has been discovered that certain mixtures including one or more of the group III and group V elements, thallium, indium, arsenic, antimony and bismuth, together with one or more of the group VI elements, sulfur, selenium and tellurium within certain critical composition ranges, form single-phase glasseous compositions. These new compositions evidence a low viscosity in the range of from about 125° C. to about 450° C. and higher, having liquid viscosities over this range of the order of 30 poises and lower. It is further found that the properties of these glassy compositions are such that they are suitable for use as a hermetic sealant for semiconductor devices including those of the types discussed above. Due to the very low liquid working temperature of these new compositions, the glass coating may be produced merely by dipping a device into the molten mixture, withdrawing and permitting the glass to solidify. Where it is desired to have a metallic or other sheathing about the solidified glass, the device may be left immersed and the glass permitted to solidify within the container so that the container material becomes part of the final assembly.

Other encapsulating procedures applicable to all circuit elements as well as to assemblies and subassemblies including printed wiring boards make use of pre-forms and vapor deposition as well as dipping procedures.

Although the term "encapsulation" is generally used in this description, it is to be understood that the invention is not limited to total encapsulation of the entire device or assembly. In certain instances, particularly where use is made of vapor deposition or pre-forms, it may be necessary or desirable to coat only one surface, or even a limited portion of a surface, of the article. Also, as described herein, the "encapsulating" medium may be intended primarily for use as a getter, in which function it might serve as a filling medium inside of an outer container such as a can, tube or the like. In such usage it is, of course, not necessary that the glass medium form a hermetic seal about the article. In other uses the glass medium may serve, in its true sense, as a hermetic encapsulating medium but, nevertheless, be encompassed by one or more additional container layers intended primarily to improve rigidity and handling properties. Where a device so hermetically sealed is to be exposed to extremely low temperatures, and where other design criteria dictate the use of metal or other material leads or other subcomponents having a mismatched temperature coefficient of expansion relative to the glass, it may be desirable to include an outer layer of adherent material such as polyethylene or other plastic designed to keep the glass layer under compression and thereby further minimize cracking tendency due to thermal shock. The glass media described wet most metals and have temperature coefficients of expansion sufficiently matched with such metals to withstand the spread in ambient temperautres generally encountered in use.

The invention is more readily understood by reference to the accompanying drawings, in which.

Figure 10:
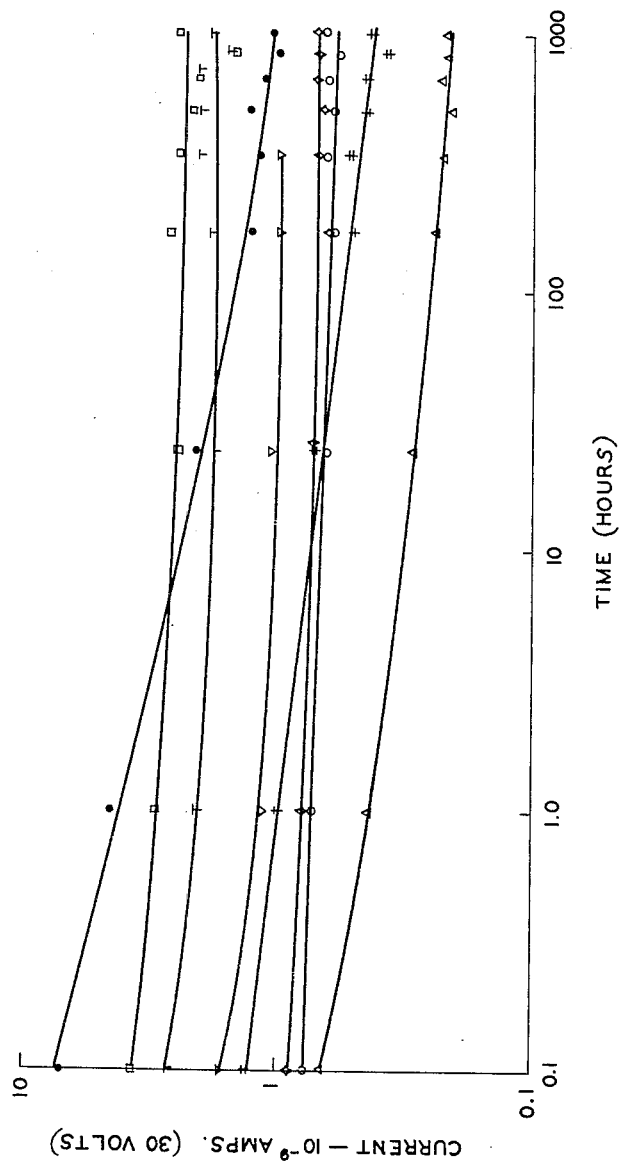

Fig. 10, on coordinates of leakage current and time, is a plot showing the improvement in operating characteristics of nine devices encapsulated in a glass composition herein upon power aging; and Fig. 11, on the same coordinates, is a plot showing the improvement realized upon power aging of four devices encapsulated in a different glass-coated composition herein.

Referring again to Fig. 1, there is shown a ternary composition diagram for the arsenic-thallium-sulfur system. The area defined by the straight lines joining points 1, 2, 3, 4 and 5 defines the exclusive range of compositions of this system resulting in a single-phase glassy material. The area enclosed by the straight lines joining points 4, 5 and 6 defines a smaller range of such glassy materials, the included compositions having particularly low softening points. Encircled points 7 correspond with glasseous compositions of this invention used in the encapsulation of devices, some of which are reported in the examples herein for which before and after electrical characteristics are set forth. Encircled points 8 correspond with included compositions which have been vapor deposited to produce homogeneous single-phase glass layers.

The compositions in weight percent corresponding with the numbered points are as follows:

*Table I*

| Point | Arsenic | Thallium | Sulfur |
|---|---|---|---|
| 1 | 65 | 0 | 35 |
| 2 | 25 | 55 | 20 |
| 3 | 22 | 46 | 32 |
| 4 | 33 | 7 | 60 |
| 5 | 10 | 0 | 90 |
| 6 | 33 | 0 | 67 |

Figure 1:
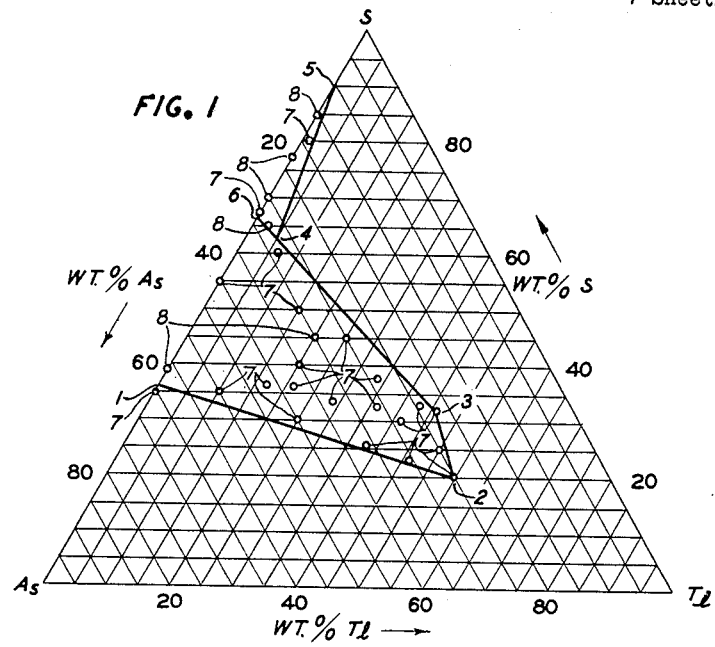
Fig. 1 is a ternary composition diagram showing the glasseous range of compositions of one system in accordance with this invention.
Figure 2:
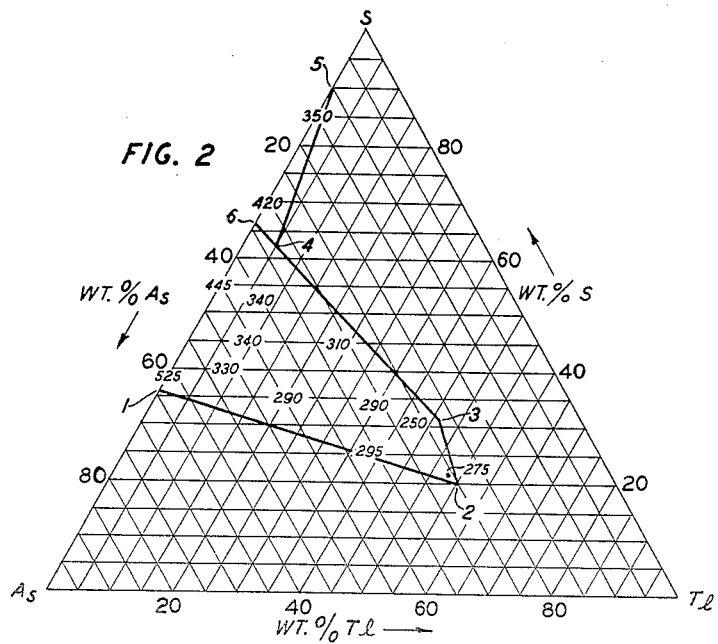
Fig. 2 is a 30-poise viscosity thermograph of the glass system of Fig. 1.

Fig. 2 is a ternary diagram for the arsenic-sulfur-thallium system on the same coordinates as the diagram of Fig. 1, showing the temperature at which certain of the noted compositions have an approximate viscosity of 30 poises. The temperatures are expressed in degrees centigrade. The precise composition points are at the centers of each of the middle digits of the noted temperatures. The information contained on this figure is of particular interest in the dip-encapsulation of delicate devices. In general, viscosities substantially in excess of 30 poises are unsuitable in the dip-coating of semiconductor devices due to the delicate nature of the device being encapsulated. Viscosities of somewhat higher orders are suitable in encapsulating media to be used on larger or more rigid devices or assemblies.

Figure 3:
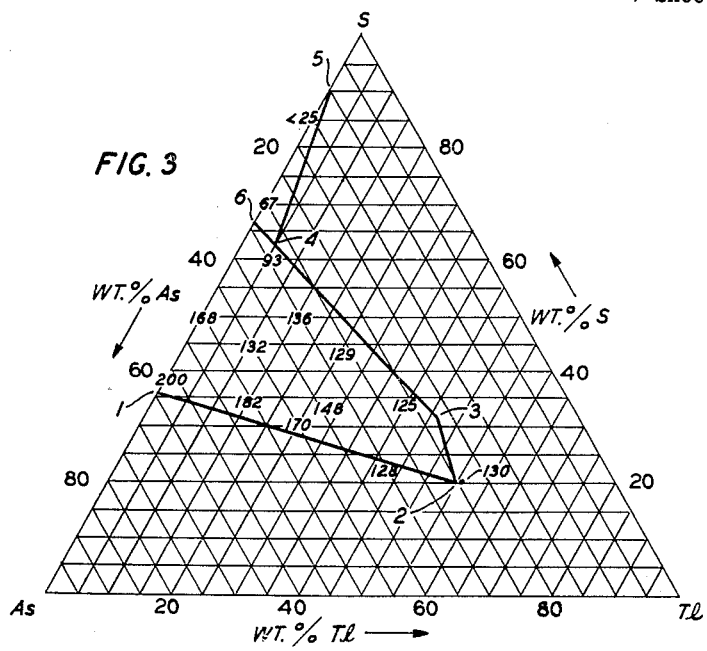
Fig. 3 is a ternary composition diagram of the system of Fig. 1 showing softening temperatures of selected compositions in the defined glass-forming region.

Fig. 3 is a ternary diagram for the arsenic-sulfurthallium system on the coordinates of the diagrams of Figs. 1 and 2 containing temperature notations corresponding with softening temperatures of the designated compositions. The precise compositions are those corresponding with a point made at the center of each designated temperature value. It is seen that the compositions enclosed within the straight line area defined by points 4, 5 and 6 in Fig. 1 have softening points significantly lower than those of the other included compositions. Softening point data of the type here presented is of chief interest in the design of encapsulated devices intended for exposure to extremely low temperatures. It is seen that certain of these compositions in the sulfur-rich area defined by points 4, 5 and 6 have softening points at or below room temperature.

It should be noted in passing that softening point data is of significance relative to another aspect of this invention. It is seen from the information herein presented that the gettering action of the glass compositions of this invention is a function of temperature, such action increasing with increasing temperature. Accordingly, it is hypothesized that gettering is at least in part dependent upon the mobility of ionic impurities across the device material-glass interface and in the glass layer itself. Since the mobility of such impurities is expected to be greater the more fluid the medium, an increase in gettering action is expected in materials having lower softening points. Experimental data appears to substantiate this hypothesis, improvement in electrical characteristics in encapsulated semiconductor devices appearing to be more rapid for those devices encapsulated in the sulfur-rich compositions of area 4—5—6.

Figure 4:
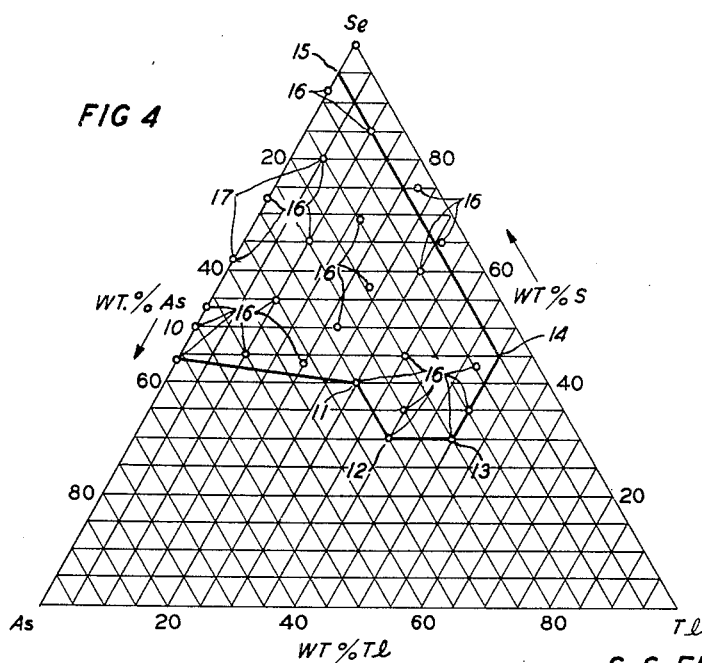
Fig. 4 is a ternary composition diagram defining the glass-forming region of a second compositional system herein.

Fig. 4 is a ternary diagram for the arsenic-thallium-selenium system. The area formed by the straight lines joining points 10, 11, 12, 13, 14 and 15 defines the range of single-phase glasseous compositions of this system. Encircled points 16 correspond with the compositions of glasses actually formed in the determination of the defined area. Compositions corresponding with points 17 have been vapor deposited.

The compositions in weight percent corresponding with the numbered points are as follows:

*Table II*

| Point | Arsenic | Thallium | Selenium |
|---|---|---|---|
| 10 | 56 | 0 | 44 |
| 11 | 30 | 30 | 40 |
| 12 | 30 | 40 | 30 |
| 13 | 20 | 50 | 30 |
| 14 | 5 | 50 | 45 |
| 15 | 5 | 0 | 95 |

Figure 5:
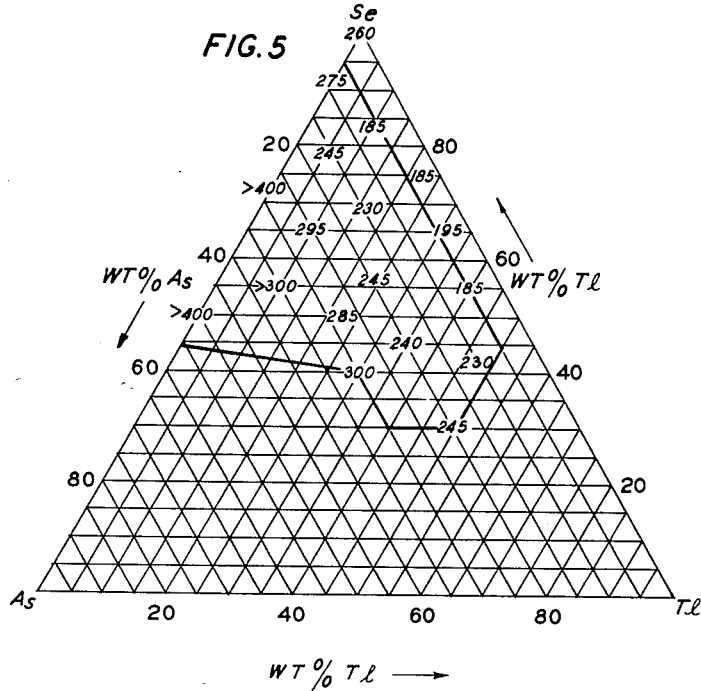
Fig. 5 is a 30-poise viscosity thermograph of the glass system of Fig. 4.

Fig. 5 is a ternary diagram for the system arsenic-selenium-thallium on the coordinates of the diagram of Fig. 4. Temperatures corresponding with 30-poise viscosities are noted. Compositions upon which such viscosity measurements were made correspond with a point taken at the middle of the second digit of each of the noted temperatures.

Although the defined glassy regions of Figs. 1 and 4 are described as "exclusive," it should be understood that the precise boundaries depicted are approximate by nature and intimately dependent upon processing conditions. Glassy regions of either of the two systems may be extended slightly by rapid cooling, so as to minimize recrystallization. By analogy to other glassy compositions, it is expected that materials substantially outside the glassy ranges indicated may be stabilized in the amorphous state by the addition of one or more stabilizing ingredients. It should further be noted that although two separate and distinct systems have been described, the glasses of the two systems are miscible one with the other so that media having requisite encapsulating characteristics may be produced by combinations of compositions of the two systems or by combinations of initial ingredients designed to produce such final composition. As is seen from the data thus far presented, binary materials of both systems, that is, arsenic-sulfur and arsenic-selenium, either stoichiometric or non-stoichiometric, have characteristics suitable for certain described uses. Similarly, combinations of two such binary compositions or combinations of initial ingredients designed to produce a composition of the three-element system, arsenic-sulfur-selenium, have been found to have 30-poise and softening point temperatures well within the range suitable for encapsulation by dipping, pre-forming or vapor deposition. As also indicated, substitution of certain designated materials for one or another of the elements of the concerned systems, singly or in combination, are satisfactorily used in the encapsulating procedures herein.

Although the two systems of Fig. 1 and Fig. 4 have been separately set forth, and although all included compositions have gettering properties and are otherwise good encapsulants, it should be understood that they are not completely interchangeable, any more than are selected glasses of any one system; that is, certain characteristics, e.g., softening point, 30-poise point, may dictate use of one or another. In this connection it has been found that although the wetting properties of the arsenic-sulfur-thallium glasses are sufficient to produce a hermetic seal about semiconductor devices and associated leads, the wetting power of the selenium-containing glasses is substantially greater. Although the increased wettability resulting from use of the arsenic-selenium-thallium glasses may not dictate their preferred use for encapsulation of such devices, it may dictate a preference for the coating or encapsulation of materials more difficultly wetted. Accordingly, it has been found that a substantially stronger bond results to ceramic boards such as are used in printed circuitry by use of the selenium-containing compositions.

To aid in the teaching of the invention, a general outline describing one suitable method of preparing a glass composition of this invention is presented below. The method outlined is illustrative only. Alternate procedures are suggested and still others are known to those skilled in the art. The outlined method is directed to the preparation of a ternary composition in accordance with the diagram of Fig. 3; that is, to a composition of the arsenic-thallium-sulfur system. The same procedure may be followed for a glass of the arsenic-thallium-selenium system and for glasses containing partially substituted antimony or bismuth for arsenic, indium, tin or lead for thallium and tellurium for selenium or sulfur as reported herein. As is also discussed below, the glasses of this invention are not limited to the inclusion of two or three elements, but may contain more than one element in any given position, as for example both sulfur and selenium in the group VI position.

For ease of storage of starting material and general convenience in preparation and handling, binary compositions of, for example, arsenic and sulfur, and thallium and sulfur may be first prepared. An alternate method is to make the final mix from the three elemental materials.

OUTLINE OF PREPARATION

The starting materials are thallium, powdered sulfur and metallic arsenic.

The oxide layer is removed from the thallium by placing in a beaker of hot water and then immersing in acetone to prevent reoxidation which otherwise occurs in air in a few minutes.

The thallium is weighed and the amounts of sulfur and arsenic required to form the desired composition are calculated.

The indicated amount of sulfur is weighed out and is placed within a loosely corked test tube which is, in turn, held over a Bunsen burner. The sulfur is heated until it is melted to a thick gummy consistency. The test tube or other receptacle may be left open if a protective inert atmosphere is used.

The thallium is removed from the acetone, is quickly dried, and together with the arsenic is placed in the test tube containing the molten sulfur. The tube is then recorked.

The tube and contents are heated until a violent exothermic reaction occurs during which the contents of the tube turn red hot (for the glass system under discussion a temperature of approximately 350° C. to 450° C. was required).

The contents of the tube are mixed by swirling until all metallic arsenic goes into solution.

The tube is heated until the contents are entirely fluid.

In practice, it has been found that a 50-gram mixture is fused to homogeneity in about twenty minutes.

The fused mixture may be quenched in liquid nitrogen to prevent adhesion to the receptacle.

The above outline defines the manufacture of the glasses of this invention on a laboratory scale. Laboratory alternatives as well as modifications necessary to put the process in commercial use are not described and are not considered necessary to the teaching of this invention. Actual reaction and fusion times are for the most part determinable by visual inspection. Actual operating temperatures are similarly of little significance, varying in accordance with the actual composition of the mix and fixed by the nature of the reaction. So, for example, the temperature at which the glass composition is formed is determined by the energies involved in the exothermic reaction and by the temperature gradients which are tolerated by the apparatus under the ambient conditions in use.

Figure 6A:
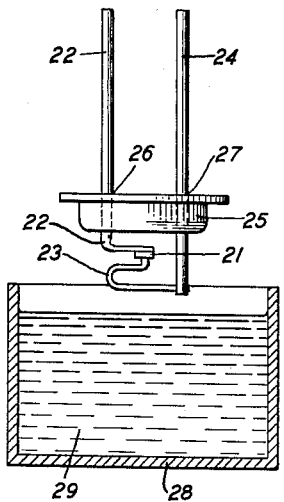
Figs. 6A, 6B and 6C are diagrammatic front elevational views of a typical semiconductive transducing device undergoing an encapsulation process of this invention utilizing one of the compositions herein.
Figure 6B:
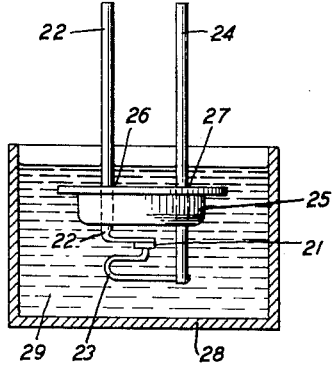
Figure 6C:
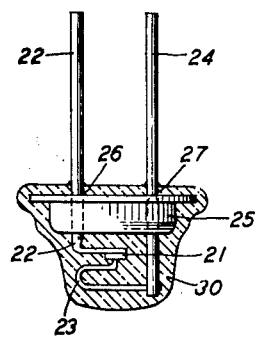

In Figs. 6A, 6B and 6C the device depicted is a silicon p-n-p-n transistor switch. This type of device contains operative p-n-p-n element 21 which is bonded to electrode 22 and to which second electrical connection is made through spring 23, which is, in turn, soldered or otherwise connected with electrode 24. Header 25 completes the assembly. Electrodes 22 and 24 pass through header 25 at 26 and 27 and are insulated from and bonded thereto by use, for example, of a lead glass or borosilicate glass. A more complete description including the operating characteristics of this type of device is contained in the Proceedings of the Institute of Radio Engineers, volume 44, at page 1174 et seq. The particular device depicted has extremely close spacings, of the order of tenths of a mil, and contains paired junctions separated both by p- and n-type material. Devices of this general configuration are extremely sensitive to deterioration of electrical properties, due to surface contamination.

In Fig. 6A, the depicted device is shown poised above container 28, which may be made of chemical porcelain or other glass, metallic or ceramic material, said container containing molten glasseous material 29, which is one of the compositions of this invention. Glasseous material 29 is maintained molten by heat source not shown.

In Fig. 6B, junction device 21, together with the assembly described above, is shown immersed in material 29 within container 28.

After immersion, which may be of the order of a few seconds or greater, device 21, together with its assembly, is withdrawn and the glasseous material adhering thereto is permitted to solidify.

Fig. 6C shows such a device after solidification. Glasseous material 30 of the composition of material 29 of Figs. 6A and 6B has solidified.

Figure 7A:
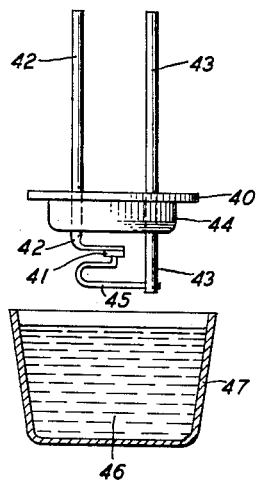
Figs. 7A, 7B and 7C are diagrammatic front elevational views of the same type of transducing device undergoing encapsulation by an alternate process of this invention.
Figure 7B:
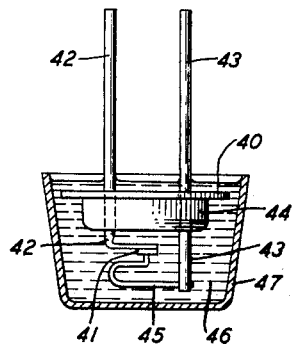
Figure 7C:
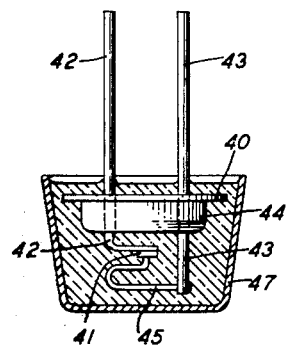

Figs. 7A, 7B and 7C illustrate an alternate encapsulation procedure whereby the receptacle becomes part of the final assembly. In accordance with these figures, there is shown device 40 of the same general configuration as that shown in Figs. 6A through 6C and containing element 41, electrodes 42 and 43 passing through header assembly 44, electrode 42 making contact with element 41 and electrode 43 making connection with element 41 through spring 45. Receptacle 47, which may be of glass, metal, or ceramic, heated by means not shown, contains a liquid glass 46 of a composition in accordance with this invention.

Fig. 7A shows device 40 prior to immersion. Fig. 7B shows device 40 immersed in molten glass 46. Material 46 is maintained molten for a period at least sufficient to produce enclosure of all immersed surfaces.

In accordance with Fig. 7C, material 46 has been solidified so as to result in the encapsulation of device 40 within glassy medium 46 and also including sheathing 45 which originally served as the receptacle for the molten material.

Figs. 6A through 6C and 7A through 7C depict species of the encapsulating procedures using the glasses here described. Other procedures include various other means for applying the molten media to the devices as, for example, by brushing, spraying, etc., and also vapor deposition. As noted herein, it is not necessary to encapsulate the entire device. For example, where pre-forms are to be used, it is convenient to form it in such manner that it closely fits over one or more leads attached to the most vulnerable spot of the device, subsequent heating producing sufficient flow to cover the entire device or only this vulnerable area. Similarly, although p-n-p-n devices are exemplary of that category of devices most sensitive to atmospheric effects and therefore beneficially encapsulated in accordance with these procedures, other devices are substantially improved by similar treatment. So, for example, resistors, capacitors, rectifiers, both elemental and oxide, inductors, transformers, and other circuit elements, as well as entire assemblies and subassemblies including such elements, are beneficially encapsulated both by the procedures of Figs. 6 and 7 and by others described herein. Where devices are to be dip coated in the manner described, it is convenient to maintain a mass of the molten glass at its dipping temperature, generally considered to correspond with a viscosity of the order of about 30 poises, as by a hot plate. To protect the glass and possibly also the device or other article from oxidation at such elevated temperature, it is desirable to maintain the molten material in a partial vacuum or in an inert atmosphere. Suitable atmospheres include nitrogen, helium and argon. In such dip encapsulation it is necessary only to keep the article immersed in the molten glass for a period sufficient to result in encasement of all surfaces of concern, leaving only the extremities of the leads uncoated, although as described herein longer periods may be desired to remove impurities. All that remains is to withdraw the article from the mix and permit the coating to solidify.

In accordance with conventional techniques the glass-encased article may be annealed to minimize strain by gradually reducing temperature from the softening temperature down to room temperature over a period of hours. This annealing procedure may be part of the initial cooling program after encapsulation or may be carried out as a separate procedure afterwards.

Where encapsulation is to be carried out by dipping and where the devices to be encapsulated are delicate, it is desirable to maintain the molten mix at a temperature such that its viscosity is not substantially in excess of 30 poises. The 30-poise range of these glasses is of the order of 125° C. to 450° C. The dip temperatures which may be tolerated vary in accordance with the characteristics of the device which is to be encapsulated. No attempt is here made to define such critical temperatures for the vast range of devices which are advantageously encapsulated in accordance with this invention. In general, the maximum dip temperature which may be tolerated by a semiconductor translating device, such as a germanium or silicon, or group III–group V diode, triode, or tetrode, is determined by the lowest melting composition of any solder or alloying material which may be present. In general, in contrast to commercial glasses, even the highest temperature within the 30-poise range of the glasses herein is insufficient to produce any significant change in junction or gradient configuration or properties due either to alloying or diffusion. 30-poise temperatures of the glass compositions are set forth on Figs. 2 and 5.

Where it is desirable to protect the glass from fracture, this may be done in any desired manner, using any suitable material without regard to possible contamination of the device. The glass seal is completely hermetic and does not permit the penetration of water vapor or any other contaminant which may come in contact with its outer surface. Plastic coating materials, such as polyvinyl chloride, polyethylene and the like, are suitable. The procedure outlined in conjunction with Figs. 7A and 7C may be advantageous for such use, since the final device in accordance with such procedure includes both a glass shield and an outer protective sheathing of metal or other suitable material.

Where the encapsulating procedure is designed to produce a completely encased glass seal, it is necessary that a hermetic bond be formed between the coating and any electrical leads. It has been found that adequate wetting and a resultant hermetic bond is formed by use of any of the glass compositions herein, in conjunction with the metals: copper, silver, gold, platinum, tantalum, molybdenum, nickel, tungsten, brass and Kovar (an alloy of the approximate composition expressed in weight per cent 53.7% iron, 29% nickel, 17% cobalt, 0.3% manganese). With certain of these metals, a strong chemical reaction results, the metal visibly dissolving in the glass. With others, the chemical reaction is weak. Bonds with all of these lead materials have, however, been made, tested and found to be firmly adherent. Although the wetting power of these glass compositions for aluminum is not as good as on any of the materials listed above, devices having aluminum leads have been dip encapsulated. Humidity testing of such encapsulated devices, including long-term exposure to 100 percent humidity conditions, has resulted in no perceptible leak or drift in characteristics associated with such leak. However, where it is considered desirable to use an aluminum lead, it is preferred that such lead be coated with one of the other metals listed above as, for example, silver or gold. The additional plating procedure may be justified since the temperature coefficient of expansion of aluminum is quite closely matched to that of the glass compositions. Such lead material may, therefore, be preferred where it is to be exposed to extremely low temperatures.

Figure 8:
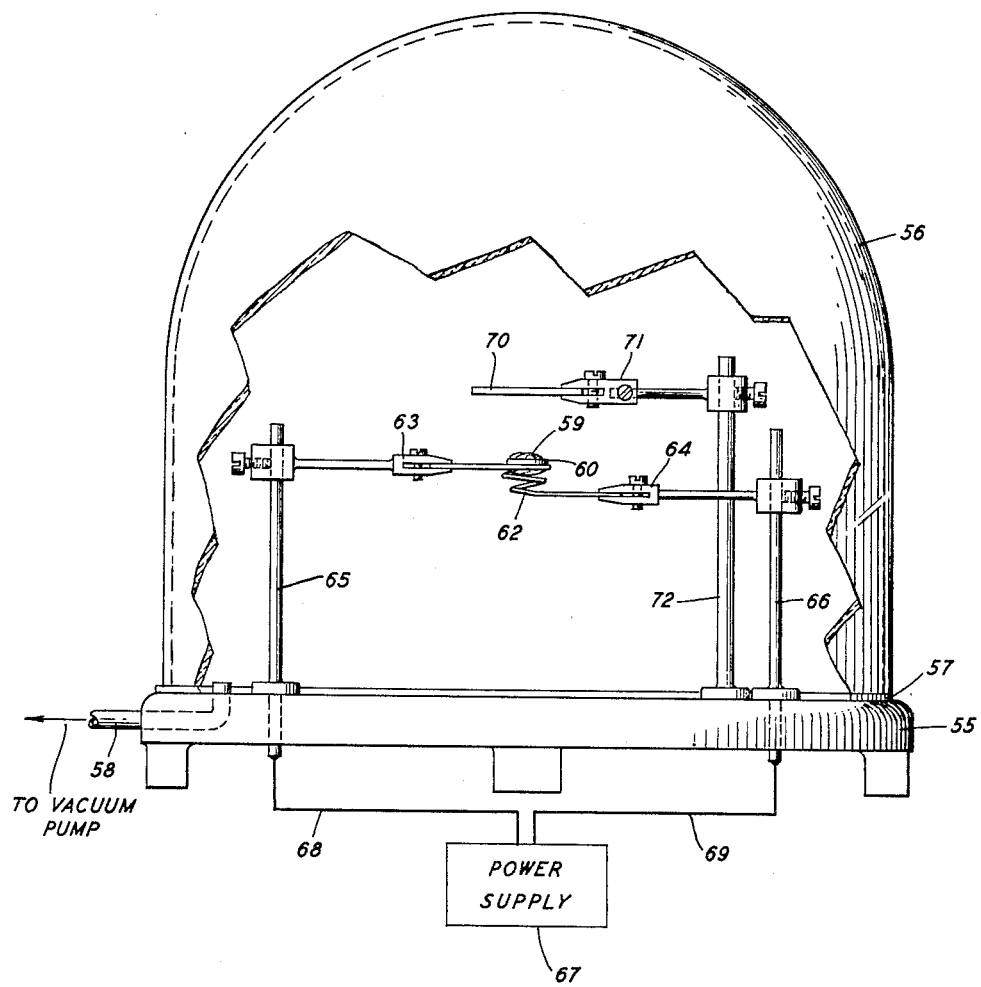
Fig. 8 is a diagrammatic front elevational view of one type of apparatus found suitable for use in the vapor deposition of the instant glass compositions.

The laboratory vapor deposition apparatus of Fig. 8 has been successfully used in the vapor deposition encapsulation with glasses of the compositions set forth. The apparatus consists of platform 55 and closely fitting bell jar 56 hermetically sealed to platform 55 by neoprene O-ring 57. The atmosphere within bell jar 56 and platform 55 is evacuated by withdrawing atmospheric gas through the tube 58 connected to vacuum pumping means not shown. The glass composition to be vapor deposited, 59, in powdered or other convenient form, is held in receptacle 60, which is, in turn, supported within the uppermost turn of conicular resistance winding 62 held by clamps 63 and 64, in turn attached to electrode-supports 65 and 66. Electrode-supports 65 and 66 are electrically connected with power supply 67 by means of wire leads 68 and 69. The article to be vapor coated, 70, typically a printed wiring board, is held by clamp 71, which is attached to support 72. Means for rotating support 72 or other means not shown may be provided for moving article 70 with respect to glass source 59.

The entire glass-forming ranges of Figs. 1 and 4, as well as the combined and substituted systems above described, may be vapor deposited. Exemplary compositions which have been vapor deposited are those designated as points 8 on Fig. 1 and points 17 on Fig. 4.

Compositions as defined herein may be vapor deposited either from a glassy source or from a powdered or other convenient mix on a heated or a cold substrate. It is considered an important advantage of these compositions that a relatively thick (1.5 mil or greater) coating may dependably be produced upon a heated or unheated substrate, common glasses being vapor deposited only with difficulty on a heated substrate.

Although a homogeneous single-phase glass results upon vapor deposition of any of the compositions herein as source materials, it should be noted that deviations between source and deposited compositions may, in certain instances, result. In this connection it has been observed that the vapor pressure of stoichiometric arsenic sulfide is somewhat greater than that of thallium or any thallium compounds contained in the arsenic-sulfur-thallium system. Where, therefore, a source is vaporized to exhaustion, the initial composition deposited is of a composition more closely approximating $As_2S_3$, the final deposited portion being enriched with respect to thallium. Although this is not considered to be of concern in most encapsulating procedures, the main effect of a variation in thallium content being observed in a change in 30-poise and softening point temperature, the deposited composition may be homogenized by heating the substrate either during deposition or subsequently where a comparatively large source or a continuous (infinite) source of glass is used. The desired composition of deposit may be produced by regulating the source composition accordingly. As noted above, selenium-containing glasses, either of the arsenic-thallium-selenium system or of substituted arsenic-sulfur-thallium systems, result in somewhat greater wetting than do the non-selenium-containing glasses. In particular, it has been observed that extremely adherent bonds are formed between selenium-containing glasses and a broad range of organic and inorganic materials including carbon, ceramic materials including those which are silica and alumina-containing, other glassy materials such as the borosilicates and polymeric materials including halogenated hydrocarbons such as the perfluorocarbons.

Vapor deposition procedures, as well as the effect of variation of spacing and other parameters in such procedures, are well known to those skilled in the art. It is not considered necessary to treat such procedures at length in this description. In general, it has been found that, operating with a source 59 of approximate diameter 1 centimeter, a coating of uniform thickness is produced on an objective 70 approximating 3 centimeters in its longest dimension at a distance of 15 centimeters. Increasing the distance between source and objective does not impair uniformity of the deposited layer but increases the time necessary to obtain any given thickness. Decreasing this distance may result in a layer of non-uniform thickness which may or may not be undesirable.

Figure 9A:
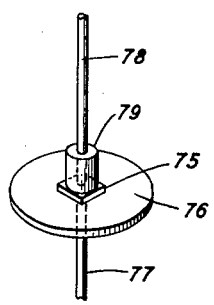
Fig. 9A is a perspective view of a semiconductor device and a pre-form of one of the compositions herein prior to heating.

Fig. 9A depicts a semiconductor device 75 attached to heat sink 76. Electrical connection is made via electrodes 77 and 78. It is considered that the sensitive portion of device 75 is in its upper surface to which electrode connection 78 is made or is otherwise in a portion of device 75 above heat sink 76. Glass pre-form 79, which may be a pressed powder body of any one of the glass compositions here described in the form of a short length of tube, is placed over lead 78 in contact with the upper surface of device 75.

The temperature of pre-form 79 is then raised to its flow temperature and there maintained for a period sufficient to produce flow about device 75 and to produce a bond between the glass and heat sink 76. Flow temperatures for the glasses herein are intermediate their 30-poise temperatures and their softening point temperatures. As an example, a 15–85 weight percent arsenic-sulfur glass composition having a softening point of about 25° C. and a 30-poise point of about 350° C. has been found to be sufficiently fluid over a temperature range of from about 160° C. to about 170° C. to produce sufficient flow over the depicted device in a period of 10 or 15 minutes.

Figure 9B:
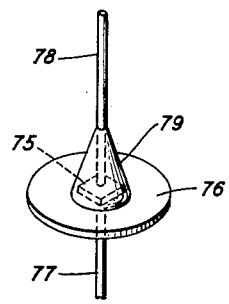
Fig. 9B is a perspective view of the device of Fig. 9A after heating.

In Fig. 9B it is seen that pre-form 79 has been distorted by heating so as to result in encapsulation of device 75 and a hermetic bond with the upper surface of heat sink 76.

Although from a laboratory standpoint, dip encapsulation appears to be the most favorable, commercial procedures are expected to make use of pre-forms. By the use of such prefabricated details, the glass medium may be added to the device immediately subsequent to manufacture, and large numbers of devices including such details may then be encapsulated by maintenance at moderate temperatures for fairly short periods.

Figs. 10 and 11 contain curves plotted from power aging data taken from phosphorus-boron diffused silicon diode devices encapsulated in glass compositions of this invention. Procedures followed are common aging procedures generally utilized to screen devices. In commercially encapsulated devices, the aging procedure is expected to bring out any latent defects and to otherwise stabilize the operating characteristics, generally resulting in characteristics somewhat inferior to those of the device before encapsulation. In the instance of canned devices, aging is designed to show up any serious leaks and to point up any drift in characteristics due to ionic or other sources. Such power aging tests are generally carried out under a variety of conditions. Diode devices, for example, may be biased forward or reverse at a variety of voltages. It is generally recognized that the most severe power aging is carried out under conditions that produce the most severe heating of the device. Accordingly, deterioration of characteristics and stabilization of commercial devices is most rapid under conditions of forward bias where the much larger current flow and resultant joule heating result in a substantially greater temperature increase.

At various predetermined intervals during power aging, the aging bias is removed, the device is reverse biased, and the leakage current is measured. The ordinate units on Figs. 10 and 11, expressed in millimicroamperes, are a measure of such leakage currents. It is conventional to measure such leakage currents under a reverse bias which is a substantial fraction of the breakdown voltage of the device under test. The devices from which the data of Fig. 10 were taken were low voltage diodes having a breakdown voltage of about 55 volts. Leakage currents were measured under a reverse bias of 30 volts. The devices from which the data of Fig. 11 were taken were high breakdown diodes designed to have a breakdown voltage in excess of 200 volts. Leakage current measurements were made under a reverse bias of 60 volts. It should be noted in this connection that the current carrying capacity of a device is at least in part dependent upon the size of the heat sink to which the device is attached. Since heat sinks were not used in the devices here under discussion, and since they were designed for use with heat sinks, it is believed that the leakage current measurements were carried out under particularly severe conditions.

The devices of Fig. 10 were dip encapsulated in a glass of weight composition 35% arsenic, 5% thallium, 60% sulfur. It is seen from the curves that the leakage current showed a regular decreasing trend for all devices tested, the average decrease for the 1000-hour test being of the order of one order of magnitude. During test these devices were forward biased sufficiently to produce a constant 200 milliampere current flow.

The devices shown on Fig. 11 were encapsulated in a composition of 15% arsenic, 85% sulfur by weight. Leakage currents are seen to have been reduced by about 80% of initial values.

The data of Figs. 10 and 11 are a minor portion of an extensive series of tests carried out to determine the effect of glass encapsulating media. In general, it was observed, both from the data produced and from similar measurements made on other devices, that leakage currents in glass-encapsulated devices are uniformly reduced by power aging. In general, the improvement so obtained is proportional to the severity of the test, greater improvement being observed for more severe conditions. Comparative data measured on devices of the same type which were encapsulated by commercial procedures showed erratic behavior upon power aging under similar conditions, some such devices showing slight improvement, some stabilizing early in the test procedure, and some showing severe impairment of operating characteristics.

It should be noted that power aging is generally used by those skilled in the art to screen devices in accordance with operating characteristics. It is not expected that any such conditioning will result in an improvement in characteristics. In the instance of the glass-encapsulated devices for which the data of Figs. 10 and 11 are reported, as well as for other devices so encapsulated, tested in similar manner, the operating characteristics were uniformly improved. By reason of such uniformity a high degree of reproducibility is assured.

The devices tested in accordance with the aging runs of both Figs. 10 and 11 have not been preselected. All devices run in each test are reported. In the comparative testing of canned devices, a representative group so large as that reported in Fig. 10 invariably showed some failures, probably due to the leaks. Although it is seen that there was some slight variation in aging characteristics of the devices reported, there were no failures. All of the devices had sufficiently low leakage currents, prior to testing, so as to meet the commercial standards applicable to each of the types. Although the improvement noted was brought about by deliberate power aging, it should be noted that these tests were designed as accelerated aging tests and that they are in all ways indicative of characteristics resulting upon actual use. Actual operation of glass-encapsulated devices in accordance with this invention therefore results in improvement of operating characteristics which will approach those indicated in Figs. 10 and 11 proportionally as the combined operating conditions and time in actual use effectively approach those of the test conditions reported. Similarly, power aging, or actual use, of other circuit elements or of assemblies or subassemblies encapsulated with any of these glass media will show an improvement in operating characteristics overcommercially encapsulated or unencapsulated elements insofar as any drift in characteristics is due to the presence of ionic impurities.

Another important trend is noted in the curves of Figs. 10 and 11. Whereas a substantial decrease in leakage current has resulted upon power aging for periods of the order of 1000 hours, it is seen that there is no substantial convergence of the characteristics and no significant leveling off of the curves. It must, therefore, be assumed that further aging and/or actual use will result in still further ionic gettering and resultant improvement of operating characteristics.

Figs. 10 and 11 demonstrate the improvement in operating characteristics which results upon power aging. The devices so tested were prepared in accordance with commercial standards of cleanliness and were in all respects acceptable before test. As was noted above, improvement in operating characteristics may result at two stages in processing prior to operation. The first such step, encapsulation itself, has, in certain instances, resulted in a substantial decrease in leakage current. This effect is the more pronounced where the device was not properly cleaned prior to encapsulation and so contained a high concentration of ionic contaminants on its surface. This effect is, of course, increased with increased exposure to the molten material and is, therefore, more pronounced in dip encapsulation than in vapor deposition encapsulation, particularly on an unheated substrate. It has also been found that significant improvement may result merely upon heating the encapsulated articles for a period of several hours at temperatures of the order of 100 to 200° C. As noted, the success of such treatment is in part dependent upon the softening points of the encapsulating media, greater improvement resulting upon heating of devices encapsulated in compositions having lower softening points, e.g., the sulfur-rich phase encompassed by the lines joining points 4, 5 and 6 of Fig. 1. However, although lower softening point compositions appear to show somewhat greater improvement in operating characteristics for a given time and temperature of aging, it is expected that all elements encapsulated by any one of the compositions herein described will ultimately attain a condition in which its characteristics are unaffected by ionic impurities. This ultimate value is, of course, dependent upon the device itself rather than on the nature of the glasseous encapsulating medium.

The following tables illustrate the advantageous change in characteristics which may be brought about during encapsulation or upon subsequent accelerated shelf aging (in which the device is maintained at an elevated temperature without the passage of current). The following table has reference to high breakdown phosphorus-boron diffused silicon diodes. The two columns show leakage currents $I_R$ before and after encapsulation under a reverse bias of 200 volts. The glass used was of the composition 19.5% arsenic, 79.5% sulfur, 1.0% thallium, all expressed by weight percent. Units are expressed in millimicroamperes.

*Table III*

| $I_R$ Before Encapsulation | $I_R$ After Encapsulation |
|---|---|
| 90 | 22 |
| 80 | 22 |
| 130 | 35 |
| 90 | 47 |
| 58 | 20 |
| 80 | 41 |
| 100 | 30 |

The maximum leakage current permissible in accordance with the manufacturing specification for the high breakdown devices tested in Table III is 100 millimicroamperes under the test conditions. It is seen, therefore, that each of the devices dipped, with the exception of the third, meets the commercial standard for this device both before and after dipping. In this connection it is interesting to note that the improvement in leakage current for the third device was of the same order of magnitude as the others.

Table IV contains a tabulation of before and after leakage currents measured on low voltage silicon diodes. The diodes are of a commercial type rated at 52 volts breakdown. Leakage currents were measured under a reverse bias of 40 volts. The glass used was 85% sulfur, 15% arsenic, all expressed by weight. Units are expressed in millimicroamperes.

*Table IV*

| $I_R$ Before Encapsulation | $I_R$ After Encapsulation |
|---|---|
| 45 | 13 |
| 24 | 20 |
| 24 | 3.2 |
| 36 | 13 |
| 22 | 3.5 |
| 44 | 12 |

All of these devices were within the manufacturing specification requirements both before and after encapsulation.

Table V contains similar data for six 52 volt silicon diodes of the type discussed above. Leakage current was measured under a reverse bias of 40 volts. The glass encapsulating medium was of weight composition 60% sulfur, 35% arsenic, 5% thallium. Units are expressed in millimicroamperes.

*Table V*

| $I_R$ Before Encapsulation | $I_R$ After Encapsulation |
|---|---|
| 24 | 4.6 |
| 26 | 12 |
| 22 | 5.8 |
| 24 | 12 |
| 26 | 4.7 |
| 26 | 12 |

The following tabulated results demonstrate the further improvement obtainable upon accelerated shelf aging. Again, it should be noted that merely heating the encapsulated device or assembly as indicated without passage of current therethrough is considered by those skilled in the art only as accelerated shelf aging. It is expected, therefore, that any results so obtained would also be obtained upon normal or non-accelerated shelf aging.

The following table reports leakage currents of low voltage breakdown diodes of the type described above after encapsulation and also after heating for from seventeen to nineteen hours at a temperature of 130° C. The glass used was of the following composition expressed in weight percent: 60% sulfur, 35% arsenic, 5% thallium. Reverse currents were measured under a bias of 40 volts, or about 12 volts below rated breakdown. Units are expressed in millimicroamperes.

*Table VI*

| $I_R$ After Encapsulation | $I_R$ After Heating |
|---|---|
| 26 | 0.9 |
| 200 | 4.0 |
| 270 | 1.0 |
| 26 | 1.6 |
| 200 | 1.2 |
| 2,000 | 2.1 |

The units tested in accordance with Table VI were acceptable in accordance with applicable manufacturing standards only if their reverse current under the indicated test conditions was below 200 millimicroamperes. Accordingly, it is seen that four out of the six units tested were "rejects" which had apparently not been substantially improved by dipping. It is interesting to note that even in these instances heating at a moderate temperature of about 130° C. for a period of less than a day resulted in a reduction of leakage current to figures well within the specification limit.

The devices for which data are tabulated in Table VII are high breakdown diffused junction diodes. In accordance with the applicable manufacturing specification, such a device is acceptable if its leakage current under a reverse bias of 200 volts does not exceed 200 millimicroamperes. However, the leakage current limit here used in the aging tests for glass-encapsulated devices in accordance with this invention was 30 millimicroamperes for this particular group of devices. All of the devices tabulated in this table are, therefore, "reject units." They represent about 20 percent of the total number of units in a particular glass encapsulation series. The glass composition was 60% sulfur, 35% arsenic, 5% thallium, all expressed in weight percent. The first column contains a listing of leakage currents after dipping; the second contains such values for the same devices after static aging for 16½ hours at 150° C. in air. Units are expressed in millimicroamperes.

Table VII

| $I_R$ After Encapsulation | $I_R$ After Heating |
|---|---|
| Over 1,000 | 9 |
| 300 | 6 |
| 55 | 11 |
| Over 1,000 | 3 |
| 60 | 20 |
| 300 | 150 |

It is seen that heat treatment of these "reject units" resulted in recovery of five out of six units to within the 30 millimicroampere permissible limit.

Comparison of the data tabulated in Tables VI and VII with that plotted on Figs. 10 and 11 reveals that the same order of magnitude improvement in operating characteristics may be realized by either accelerated power aging or accelerated shelf aging. Both types of accelerated tests are designed only to indicate the changing characteristics which will result either upon shelf aging or in use. However, where it is desired to produce devices having the best initial properties, or where it is desired to recover devices which do not meet the manufacturing specifications, it may be desirable to introduce one or the other type of accelerating aging procedure as a regular manufacturing step after encapsulation in conjunction with these methods. From the data here presented, and other data of which this is representative, it appears that it would be most feasible that this step take the form of thermal aging rather than power aging. For best results, such thermal aging should be carried out at the highest permissible temperature which is commercially feasible. In general, the maximum limit for such temperature is the softening point of the particular glass composition used, although higher temperatures may be advantageously used, particularly when some flow is permitted or where flow is restricted by an outer container. It is expected that the order of improvement resulting from such thermal aging is proportional to the ratio between the temperature used and the softening temperature on an absolute scale. It, therefore, appears that those glasses having the lowest softening points permissible for the particular use to which the device is to be put are preferred from this standpoint. The lowest softening point range of arsenic-sulfur-thallium glasses has been set forth above in the discussion relating to Fig. 1.

The glass-encapsulating media of this invention have been discussed primarily from the standpoint of ionic gettering and resultant improvement in characteristics obtained on a sensitive class of devices beneficially encapsulated in such compositions. The characteristics of the glasses set forth are otherwise beneficial, both in the described uses and in others. The body resistivities of glasses of the arsenic-sulfur-thallium system range from $10^{12}$ to $10^{14}$ ohm-cm. Those of the arsenic-selenium-thallium system range from $10^6$ to $10^{16}$ ohm-cm. Dielectric constants for glasses of the two systems are respectively from 4 to 13 and from 6 to 20. Dielectric loss in these materials, measured at 1 megacycle, are of the order of about 0.0005 and 0.0001, respectively.

Glasses of these compositions show certain unusual characteristics as bonding media. It has been noted that where the formation of an inherent bond is the prime concern selenium may desirably be included as one of the ingredients. A composition of 35% selenium, 60% sulfur, 5% arsenic has been found to form adherent bonds with glasseous materials including 0080 glass, a soda-lime glass of weight composition: 73.6% $SiO_2$, 16% $Na_2O$, 0.6% $K_2O$, 5.2% $CaO$, 3.6% $MgO$ and 1% $Al_2O_3$; and 7740 glass, a borosilicate glass of weight composition: 80.5% $SiO_2$, 12.9% $B_2O_3$, 2.2% $Al_2O_3$, 3.8% $Na_2O$ and 0.4% $K_2O$; and also with organic polymeric materials including polytrifluorochloro ethylene, sold under the trade name "Kel-F," and manufactured by Minnesota Mining and Manufacturing Company, and polytetrafluoro ethylene, sold by Du Pont under the trade name "Teflon." This glass has also been used for forming a hermetic seal about leads on deposited carbon resistors, mica button capacitors and vacuum tubes. Hermetic bonding was measured on a helium leak detector, measured leakage being less than $26.6 \times 10^{-10}$ cubic centimeters per second (the limit of the test apparatus).

Test data presented have been in terms of a parameter extremely sensitive to ionic contamination in a class of devices in which this parameter is critical. Ionic impurities are considered generally undesirable in all circuit elements and assemblies and subassemblies including such elements. In general, such contaminants result not only in an initial impairment of characteristics of concern but also in a gradual drift of such characteristics during use, the contaminants migrating under the influence of electrostatic fields, either inherent in the devices or introduced during circuit operation. The glasseous materials and encapsulating methods of this invention are considered unique in that they result in the gettering and consequent trapping of such contaminants, thereby preventing drift resulting in the impairment of characteristics sensitive to this source of contamination. Articles encapsulated in accordance with this invention show an improvement in such characteristics upon encapsulation (more pronounced where contamination is high) and also upon aging, either shelf or power, either accelerated or not. This improvement in characteristics produced upon aging is here reported for devices prepared in accordance with the highest degree of commercial cleanliness. Most of the elements for which data are here presented were acceptable prior to encapsulation and prior to aging. The small minority of elements still considered unacceptable from the commercial standpoint subsequent to encapsulation by these procedures is generally improved to well beyond recovery during a moderate period of thermal or power aging.

Due to their very nature as ion gettering materials, impurity limits of such materials in the glasseous compositions herein are not considered critical, some tests having been carried out with glasses prepared from C.P. grade ingredients. The ordinary cleanliness standards now in use in the semiconductor industry and as applied to other devices and assemblies in which the glasses are expected to be put to use are certainly adequate to result in glass encapsulations of the characteristics noted. Although it is expected that any glass composition herein, prepared by commercial standards for any of the indicated uses, will be well within any maximum limits on impurity content, it may be noted that it would be undesirable to use any such glass containing in excess of one tenth of 1 per cent of total ionic impurities. Such impurities are notably the alkali metals such as sodium, and silver.

It is believed clear that the improvement in characteristics here reported is due to the use of the encapsulating media per se and not to the particular encapsulating procedures used. The data have, for the most part, been reported for devices encapsulated by dipping, a procedure most conveniently employed in the laboratory. Suitability of these glasseous compositions for encapsulation by other procedures is set forth. Two such procedures particularly suitable from a commercial standpoint are vapor deposition and by the use of preforms. The former procedure is useful not only in the mass encapsulation of devices but also in the coating of sensitive areas of assemblies including electrical elements. An example of such an assembly is the printed circuit board. These glasseous compositions have been found to form an adherent bond with all types of materials now in use as substrate materials or as element materials. Variations in the encapsulating procedures here set forth, as well as minor variations in the glasseous compositions themselves, are apparent. It is considered that all such variations are within the scope of this invention.

The concept of using the amorphous materials here described primarily as getters has also been discussed. Accordingly, their use may replace vacuum bakeout or other cleaning procedure in conjunction with canning or other packaging. In such use, although at least local wetting of the device is still required, complete hermetic sealing is not mandatory, such function being performed by an outer container. Such incomplete coatings have been found to produce the improvement in characteristics noted. Where clean-up or gettering is the prime object, the medium may take the form of a dry powder fill, the packaged device eventually being raised to a temperature sufficient to result in flow and wetting.

What is claimed is:

1. Process comprising coating at least a portion of an electric circuit element with a single phase glass composition comprising arsenic and at least one element selected from the group consisting of sulfur and selenium.

2. Process in accordance with claim 1 in which the said glass composition includes thallium.

3. Process in accordance with claim 1 in which up to 20 mol percent of arsenic is replaced by at least one element selected from the group consisting of antimony and bismuth, in which up to 20 mol percent of any thallium present is replaced by at least one element selected from the group consisting of tin, indium and lead and in which up to 20 mol percent of the said at least one element recited in claim 1 is replaced by tellurium.

4. Process in accordance with claim 1 in which the said single phase glass is of the ternary system arsenic-thallium-sulfur and is enclosed within the area of the ternary composition diagram of these three elements defined by the straight lines joining the following composition points:

65% arsenic, 0% thallium, 35% sulfur;
25% arsenic, 55% thallium, 20% sulfur;
22% arsenic, 46% thallium, 32% sulfur;
33% arsenic, 7% thallium, 60% sulfur;
10% arsenic, 0% thallium, 90% sulfur.

5. Process of claim 4 in which the said area is defined by the straight line joining the following composition points:

33% arsenic, 7% thallium, 60% sulfur;
10% arsenic, 0% thallium, 90% sulfur;
33% arsenic, 0% thallium, 67% sulfur.

6. Process in accordance with claim 1 in which the said single phase glass is of the ternary system arsenic-thallium-selenium and is enclosed within the area of the ternary composition diagram of these three elements defined by the straight lines joining the following composition points:

56% arsenic, 0% thallium, 44% selenium;
30% arsenic, 30% thallium, 40% selenium;
30% arsenic, 40% thallium, 30% selenium;
20% arsenic, 50% thallium, 30% selenium;
5% arsenic, 50% thallium, 45% selenium;
5% arsenic, 0% thallium, 95% selenium.

7. Process in accordance with claim 1 in which the said electric circuit element is coated by dipping into a molten body of the said glass composition during which the said glass composition wets at least a portion of the surface of the said element and permitting the wetting layer so formed to solidify.

8. Process in accordance with claim 7 in which the element is withdrawn from the glass after dipping.

9. Process in accordance with claim 1 in which the said element is a portion of an electric assembly.

10. Process in accordance with claim 1 in which coating is brought about by vapor deposition of the said glass composition in a partial vacuum.

11. Process in accordance with claim 1 in which the said element is a semiconductor transducing device.

12. Process in accordance with claim 1 in which the sealed circuit element is thermally aged at an elevated temperature for a period of several hours.

13. A circuit element at least partially coated with a single phase glass comprising arsenic, and at least one element selected from the group consisting of sulfur and selenium.

14. The article of claim 13 in which the said glass composition includes thallium.

15. The article of claim 13 in which in said glass composition up to 20 mol percent of arsenic is replaced by at least one element selected from the group consisting of antimony and bismuth, in which up to 20 mol percent of any thallium present is replaced by at least one element selected from the group consisting of tin, indium and lead and in which up to 20 mol percent of the said at least one element recited in claim 13 is replaced by tellurium.

16. The article of claim 13 in which in said glass composition the said single phase glass is of the ternary system arsenic-thallium-sulfur defined by the area of the ternary composition diagram of these three elements enclosed within the straight lines joining the following composition points:

65% arsenic, 0% thallium, 35% sulfur;
25% arsenic, 55% thallium, 20% sulfur;
22% arsenic, 26% thallium, 32% sulfur;
33% arsenic, 7% thallium, 60% sulfur;
10% arsenic, 0% thallium, 90% sulfur.

References Cited in the file of this patent

UNITED STATES PATENTS

| | | |
|---|---|---|
| 2,706,692 | Chester | Apr. 19, 1955 |
| 2,883,295 | Jerger | Apr. 21, 1959 |

FOREIGN PATENTS

| | | |
|---|---|---|
| 765,307 | Germany | Aug. 16, 1954 |

OTHER REFERENCES

Journal of the Optical Society of America, vol. 43, No. 1—12, 1953, pages 823 and 1154–1157.